United States Patent
Herzog

(10) Patent No.: US 11,014,294 B2
(45) Date of Patent: May 25, 2021

(54) SYSTEM FOR ADDITIVELY PRODUCING THREE-DIMENSIONAL OBJECTS

(71) Applicant: CL SCHUTZRECHTSVERWALTUNGS GMBH, Lichtenfels (DE)

(72) Inventor: Frank Herzog, Lichtenfels (DE)

(73) Assignee: CONCEPT LASER GMBH, Lichtenfels (DE)

( * ) Notice: Subject to any disclaimer, the term of this patent is extended or adjusted under 35 U.S.C. 154(b) by 215 days.

(21) Appl. No.: 16/078,962

(22) PCT Filed: Feb. 27, 2017

(86) PCT No.: PCT/EP2017/054497
§ 371 (c)(1),
(2) Date: Aug. 22, 2018

(87) PCT Pub. No.: WO2017/157647
PCT Pub. Date: Sep. 21, 2017

(65) Prior Publication Data
US 2019/0054686 A1 Feb. 21, 2019

(30) Foreign Application Priority Data

Mar. 14, 2016 (DE) .......................... 102016104677.9

(51) Int. Cl.
*B29C 67/00* (2017.01)
*B29C 64/153* (2017.01)
(Continued)

(52) U.S. Cl.
CPC ............ *B29C 64/153* (2017.08); *B29C 64/20* (2017.08); *B29C 64/379* (2017.08); *B33Y 30/00* (2014.12);
(Continued)

(58) Field of Classification Search
CPC ..... B29C 64/20; B29C 64/153; B29C 64/379; B33Y 10/00; B33Y 30/00; B33Y 40/00; B33Y 50/00; B33Y 50/02
See application file for complete search history.

(56) References Cited

U.S. PATENT DOCUMENTS 5,386,500 A 1/1995 Pomerantz et al.
2015/0314389 A1 11/2015 Yamada
(Continued)

FOREIGN PATENT DOCUMENTS

DE 10053741 C1 2/2002
DE 102004057866 A1 6/2006
(Continued)

*Primary Examiner* — Ryan M Ochylski
(74) *Attorney, Agent, or Firm* — Dority & Manning, P.A.

(57) ABSTRACT

System (1) for additive manufacturing of three-dimensional objects (2), comprising: a movable modular functional unit (12*a*-12*d*), a tunnel structure (21), an apparatus (3) which is configured for additive manufacturing of a three-dimensional object (2) by successive layerwise selective exposure and consequent solidification by means of an energy beam (5) of construction material layers which have been formed, wherein the apparatus (3) comprises a connecting portion (26), by means of which the apparatus (3) can be or is connected to the tunnel structure (21) so that a modular functional unit (12*a*-12*d*) can be moved starting from the apparatus (3) into the tunnel structure (21) or vice versa, a filling and/or emptying device (13) which is configured for filling with construction material (4) a reception space of a functional unit (12*a*-12*d*) moved into a filling section (14) of the filling. and/or emptying device (13).

17 Claims, 3 Drawing Sheets

(51) Int. Cl.
*B33Y 40/00* (2020.01)
*B29C 64/20* (2017.01)
*B33Y 30/00* (2015.01)
*B29C 64/379* (2017.01)
*B22F 10/10* (2021.01)

(52) U.S. Cl.
CPC .............. *B33Y 40/00* (2014.12); *B22F 10/10* (2021.01); *Y02P 10/25* (2015.11)

(56) References Cited

U.S. PATENT DOCUMENTS

2016/0243618 A1    8/2016   Heugel et al.
2017/0144372 A1    5/2017   Kuesters et al.

FOREIGN PATENT DOCUMENTS

| | | |
|---|---|---|
| DE | 102006014281 A1 | 10/2006 |
| DE | 102009005769 A1 | 8/2010 |
| DE | 102011009624 A1 | 8/2012 |
| DE | 102007018601 B4 | 5/2013 |
| DE | 102013223411 A1 | 5/2015 |
| DE | 102014007408 A1 | 11/2015 |
| DE | 102014212176 A1 | 12/2015 |
| EP | 1769903 A2 | 4/2007 |
| EP | 2926927 A2 | 10/2015 |
| WO | WO2015071183 A1 | 3/2015 |
| WO | WO2015197426 A2 | 12/2015 |
| WO | WO2015197426 A3 | 12/2015 |
| WO | 2017050860 A1 | 3/2017 |

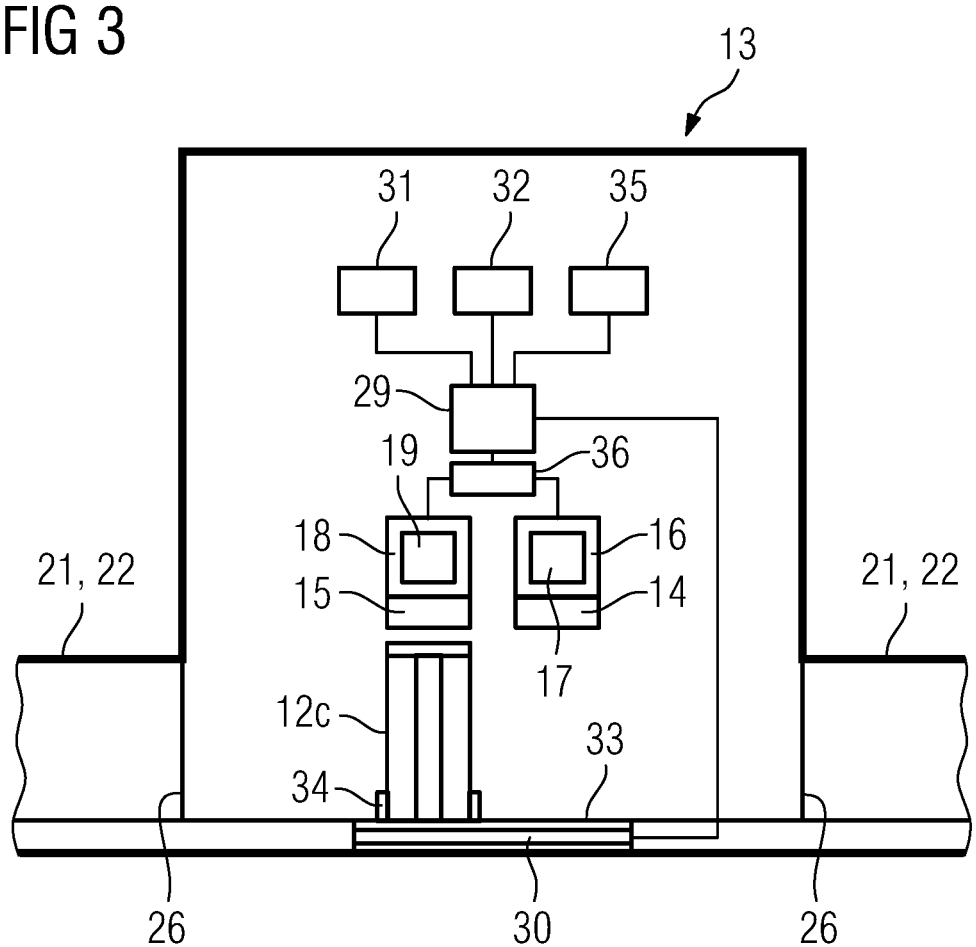

SYSTEM FOR ADDITIVELY PRODUCING THREE-DIMENSIONAL OBJECTS

CROSS-REFERENCE TO RELATED APPLICATIONS

This application is a United States national stage entry of an International Application serial no. PCT/EP2017/054497 filed Feb. 27, 2017 which claims priority to German Patent Application serial no. 10 2016 104 677.9 filed Mar. 14, 2016. The contents of these applications are incorporated herein by reference in their entirety as if set forth verbatim.

The invention relates to a system for additive manufacturing of three-dimensional objects.

Such systems for additive or generative manufacturing of three-dimensional objects are known per se. Corresponding systems comprise, inter alia, apparatuses for additive manufacturing of three-dimensional objects. By means of corresponding apparatuses, three-dimensional objects to be manufactured are manufactured additively.

In corresponding systems, the use of modular functional units it is known. Corresponding functional units, for example construction modules, metering modules, overflow modules, typically comprise a reception space for receiving construction material to be solidified in the scope of an additive construction process, or construction material not to be solidified in the scope of an additive construction process. Processes of filling and/or emptying respective reception spaces may sometimes be elaborate, since they cannot readily be automated.

There is a constant need for further development of corresponding systems with a view to semiautomatable or fully automatable additive manufacturing of three-dimensional objects. This also applies for processes of filling and/or emptying respective reception spaces on the functional unit side.

The object of the invention is to provide a system for additive manufacturing of three-dimensional objects, which is improved in relation thereto.

The object is achieved by a system according to Claim 1 for additive manufacturing of three-dimensional objects. The dependent claims relate to particular embodiments of the system.

The system described here is used in general for additive or generative manufacturing of three-dimensional objects, i.e. for example technical components or technical component groups.

The system comprises at least one apparatus for additive manufacturing of at least one three-dimensional object (referred to below as the "object" for brevity) by successive layerwise selective exposure and consequent solidification of individual construction material layers of a solidified construction material by means of at least one energy beam. The solidified construction material may be a metal powder, plastic powder and/or ceramic powder. A metal powder, plastic powder or ceramic powder may also be understood as a powder mixture of different metals, plastics or ceramics. In the case of a metal powder, it may in this regard also be a powder of at least one metal alloy. The energy beam may be a laser beam. The apparatus may correspondingly be an apparatus for carrying out selective laser melting methods (abbreviated to SLM methods) or selective laser sintering methods (SLS methods). The system may correspondingly be a system for carrying out selective laser melting methods (abbreviated to SLM methods) or selective laser sintering methods (SLS methods).

The successive layerwise selective exposure and consequent successive layerwise selective solidification of the construction material layers respectively to be solidified in order to manufacture an object is carried out on the basis of object-related construction data. The construction data generally describe the geometrical or geometry-design configuration of the object to be manufactured. The construction data may, for example, be or contain CAD data of the object to be manufactured.

The apparatus comprises all the functional component parts typically required in order to carry out additive construction processes. Corresponding functional component parts include for example a layering device for forming construction material layers to be selectively exposed in a construction plane, and an exposure device, for example comprising one or more exposure elements formed as or comprising one or more laser diode elements, for generating an energy beam for selective exposure of a construction material layer to be selectively exposed, formed in a construction plane by means of the layering device. The functional component parts are typically arranged in a housing structure of the apparatus, which may optionally also be referred to or considered as a machine housing and can typically be inerted.

The system furthermore comprises at least one modular functional unit ("functional unit"). The modular structure of a functional unit derives from a housing structure, to be referred to as a "module", in which the respective functional constituent parts of the respective functional unit are accommodated. The housing structure determines the outer geometrical configuration of the functional unit. An exemplary list of corresponding functional units will be given below:

A functional unit may be configured as a construction module. A construction module comprises at least one construction or support plate which is mounted in such a way that it can be moved, in particular height-adjustably, in a typically chamber-like reception space ("construction chamber") relative to a base body of the construction module and on which additive construction of at least one three-dimensional object can be carried out. In the scope of the additive manufacturing of three-dimensional objects, a construction module is used in particular for positioning an object to be manufactured while an additive construction process is being carried out.

A functional unit may also be configured as a metering module. A metering module comprises at least one, typically chamber-like, reception space configured in order to receive construction material to be solidified in the scope of additive manufacturing of a three-dimensional object, and optionally a metering device for metering a particular amount of construction material to be solidified in the scope of additive manufacturing of an object from the reception space. In the scope of the additive manufacturing of three-dimensional objects, a metering module is used in particular for providing (metering) a particular amount of construction material to be solidified, which is distributed uniformly in a construction plane by means of a layering device so as to form a defined construction material layer.

A functional unit may, however, also be configured as an overflow module. An overflow module comprises at least one, typically chamber-like, reception space configured in order to receive construction material not solidified in the scope of additive manufacturing of a three-dimensional object. In the scope of the additive manufacturing of three-dimensional objects, the overflow module is used in particular to receive unsolidified construction material which is to be or has been removed from a construction or process chamber of the apparatus for additive manufacturing.

A functional unit may also be configured as a handling module. A handling module comprises at least one, typically chamber-like, reception space configured in order to receive at least one additively manufactured object. A possibility for accessing or reaching into the reception space in order to "unload" the object may be provided by means of a suitable interface. The accessing or reaching may be carried out by an operator ("glove box") or by means of a robot.

Irrespective of its specific functional configuration, the respective functional unit is movable; as will be seen below, a respective functional unit may therefore be moved (to and fro) between various stationary, i.e. not movable, constituent parts of the system, which are typically connected firmly to a base.

The system furthermore comprises at least one filling and/or emptying device. The filling and/or emptying device is configured for filling a reception space of a functional unit moved into a filling section of the filling and/or emptying device with construction material, and/or for emptying construction material contained in a reception space of a functional unit moved into an emptying section of the filling and/or emptying device, and to this end correspondingly comprises a filling section and/or an emptying section. Optionally, there may be a combined filling and emptying section, i.e. a section in which both filling with construction material and emptying of construction material is possible. The filling and/or emptying device may be referred to as a "filling station", at least in respect of corresponding filling processes.

In the filling section, it is possible to fill a reception space of a functional unit moved into the filling section with construction material. The filling section comprises at least one suitable filling device configured. The filling device may comprise at least one conveyor device for conveying construction material with which a respective reception space to be filled. A conveyor device may for example be configured as a flow generating device, which is configured in order to generate a filling (blown) flow for filling a respective reception space with construction material.

A flow generating device may, for example, be configured as or comprise a blower device.

In an emptying section, it is possible to empty construction material from a reception space of a functional unit moved into the emptying section. The emptying section comprises at least one suitable emptying device. The emptying device may comprise at least one conveyor device for conveying construction material to be emptied from a respective reception space. To this end, the emptying device may be configured as a flow generating device, which is configured in order to generate an emptying (suction) flow for emptying construction material from a respective reception space. A flow generating device may, for example, be configured as or comprise a pump device.

Of course, the filling and/or emptying device may hold a plurality of (chemically) different construction materials, so that individual filling of different functional units with different construction materials is possible. A first functional unit moved into the filling section may for example be filled with a steel powder, and a second functional unit moved into the filling section or a further filling section may for example be filled with an aluminum powder. Similarly, individual emptying of different functional units is possible; (chemically) different construction materials may therefore be emptied from different functional units and stored, processed further, etc., separately from one another.

The filling and/or emptying device is expediently arranged or formed in an inertable housing structure. The housing structure associated with the filling and/or emptying device may thus be inertable, i.e. an inert atmosphere can be formed and maintained in it. Similarly, a particular pressure level, i.e. for example an elevated or reduced pressure, may be formed and maintained in the housing structure.

The system furthermore comprises a tunnel structure. The tunnel structure comprises at least one tunnel portion, in which or through which at least one functional unit can be moved. Formed or arranged in a respective tunnel portion, there is at least one movement path or movement track (referred to below as a "movement path"), along which a functional unit can be moved through the tunnel portion. Of course, it is possible to form or arrange a plurality of movement paths in a tunnel portion, at least in sections, i.e. for example movement paths arranged next to one another, in particular parallel, in one or more planes. A corresponding movement path may allow guided movement of a functional unit in or through the respective tunnel portion.

The function of the tunnel structure, or the tunnel portions associated therewith, is to connect at least two different stationary constituent parts of the system to one another directly or indirectly, i.e. for example with the interposition of at least one further tunnel portion and/or a further stationary constituent part of the system. The connection of respective stationary constituent parts of the system allows movement of respective functional units to and fro between respective stationary constituent parts of the system. Movements of respective functional units through the tunnel structure are, in particular, possible in a fully automated manner. By means of one or more tunnel portions, for example, a stationary apparatus, associated with the system, for additive manufacturing of three-dimensional objects ("construction station") may be connected to a stationary filling and/or emptying device ("filling station") associated with the system. Exemplary movements of functional units between a construction station and a filling station will be dealt with again separately below.

In principle, it is possible for the movement path, along which a functional unit is moved starting from a first stationary constituent part of the system back into a further stationary constituent part of the system, to be different than the movement path along which the functional unit has been moved starting from the stationary constituent part into the further stationary constituent part of the apparatus. The selection of a movement path of a functional unit between respective stationary constituent parts of the system may be made on the basis of particular prioritizations of particular functional units. For higher-prioritized functional units, movement paths which are of shorter length or are faster may be selected than for lower-prioritized functional units. Equally well, higher-prioritized functional units may be moved with a higher speed in comparison with lower-prioritized functional units.

In order to move respective functional units, the system comprises at least one conveyor device. The conveyor device may be coupled to a (motor) drive device, by means of which a drive force setting at least one functional unit in movement can be generated.

The conveyor device may comprise at least one conveyor means, which is arranged or formed on the tunnel structure side and is configured in order to set a functional unit in movement. Such a conveyor means may, for example, be a mechanical conveyor means, i.e. for example a belt, chain or roller conveyor, which, by its spatial extent inside a respective tunnel portion, defines a conveyor length, and therefore a movement path along which a functional unit can be moved. A corresponding conveyor means may, for example, be arranged or formed on the floor side or wall side on a wall of a tunnel portion.

The or a conveyor device may comprise at least one conveyor means, which is arranged or formed on the functional unit side and is configured in order to set the functional unit equipped with it in motion. Such a conveyor means may, for example, be an (electric) motor drive device integrated into a respective functional unit. In this way, the freedom of movement of a functional unit may be extended, since for example rotational movements about a vertical axis are possible.

The control of all the movements of the functional units moved in the system, particularly in the tunnel structure, is carried out by means of a central control device, which may expediently communicate, for example on the basis of radio, directly or indirectly with respective functional units, which to this end may be equipped with suitable communication devices. In the control device, there is expediently all the information relevant for the movement of respective functional units inside the system or the tunnel structure, i.e. in particular respective movement information, i.e. for example speed information, respective position information, i.e. for example start and target information, respective prioritization information, etc. The control of the movements of the functional units moved in the system, or in the tunnel structure, may be carried out in a fully automatic way.

A respective tunnel portion delimits at least one cavity, in which at least one functional unit can be moved. Moreover, the geometry-design configuration of a respective tunnel portion may be selected in any desired way, with the condition that at least one functional unit can be moved in it, or through it. A respective tunnel portion may for example have a round, roundish or polygonal cross-sectional area. In respect of its longitudinal extent, a respective tunnel portion may be configured extending in a straight line, at least in sections, in particular fully, or in a bent or curved manner, at least in sections, in particular fully. Of course, a respective tunnel portion may be formed from a plurality of tunnel portion segments, which can be or are connected to one another so as to form the respective tunnel portion.

A respective tunnel portion may open into at least one further tunnel portion, for example extending at an angle to it. The tunnel structure may—in a similar way to a track or rail system known from railroad traffic—comprise a plurality of tunnel portions opening into one another at defined positions. A plurality of tunnel portions may extend next to, above or below one another, at least in sections. The tunnel structure may therefore comprise a plurality of tunnel portions extending next to, above or below one another, at least in sections, i.e. in different (horizontal and/or vertical) planes.

A respective tunnel portion may be inertable, i.e. an inert atmosphere can be formed and maintained in it. Similarly, a particular pressure level, i.e. for example an elevated or reduced pressure, may be formed and maintained in a respective tunnel portion.

In order to be connected to the tunnel structure, individual, several or all of the stationary constituent parts of the system may comprise a connecting portion, by means of which they can be or are connected to the tunnel structure.

Specifically, the apparatus comprises at least one connecting portion by means of which the apparatus can be or is connected to the tunnel structure. Functional units can therefore be moved starting from the apparatus into the tunnel structure, or starting from the tunnel structure into the apparatus.

In a similar way to the apparatus, the filling and/or emptying device also comprises at least one connecting portion, by means of which the filling and/or emptying device can be or is connected to the tunnel structure. Functional units can therefore be moved starting from the filling and/or emptying device into the tunnel structure, or starting from the tunnel structure into the filling and/or emptying device. Functional units may therefore be moved to and fro through the tunnel structure between the apparatus and the filling and/or emptying device.

It is also possible for at least one tunnel portion of the tunnel structure to be arranged or formed in respective stationary constituent parts of the system, particularly in the apparatus or in the filling and/or emptying device, this tunnel portion communicating via the respective connecting portion with at least one tunnel portion arranged or formed outside the respective stationary constituent part of the system, in particular of the apparatus or of the filling and/or emptying device.

Specifically, for example, "empty" metering modules may be moved starting from the apparatus, i.e. for example starting from a tunnel portion located inside the apparatus, through the tunnel structure into the filling and/or emptying device, i.e. for example into a tunnel portion located inside the filling and/or emptying device, filled there and moved through the tunnel structure back into the apparatus. In a similar way to this, "full" overflow modules may be moved starting from the apparatus, through the tunnel structure into the filling and/or emptying device, emptied there and moved through the tunnel structure back into the apparatus.

Overall, a system for additive manufacturing of three-dimensional objects is provided, which is improved particularly in relation to automatability of the additive manufacture of three-dimensional objects. Filling and/or emptying processes of respective functional units can in particular be automated. The advantageousness of the system is found particularly in respect of automatable additive mass production of three-dimensional objects.

The filling and/or emptying device may be assigned a detection device. The detection device typically comprises at least one detection element implemented as hardware and/or software. By means of the detection device, different detection parameters may be detected, which increases the functionality and practicability of the filling and/or emptying device. All the detection parameters detected by the detection device may be transmitted via an optionally wireless data or communication network to at least one communication partner, i.e. for example a central control device of the system.

The detection device may be configured in order to detect a functional unit moved into a filling section and/or into an emptying section of the filling and/or emptying device. By means of a correspondingly configured detection device, it is therefore possible to detect whether a functional unit is moved into the filling or emptying section of the filling and/or emptying device.

In the event that a functional unit moved into the filling and/or emptying section is detected, it is furthermore possible to detect which type of functional unit is specifically involved. The detection of a functional unit moved into the filling section of the filling and/or emptying device, or the type of this functional unit, may for example be carried out optically, i.e. for example by means of an optical scanning process, or mechanically, i.e. for example by means of detecting the weight of the functional unit acting on a weight sensor arranged or formed in a filling and/or emptying section.

The detection device may (also) be configured in order to detect at least one status parameter, in particular the operability, of at least one functional element of a functional unit moved into the respective filling or emptying section of the filling and/or emptying device. By means of a correspondingly configured detection device, it is therefore possible to detect particular status parameters, i.e. in particular the operability, of particular functional elements of a functional unit. For the example of a construction module, it is for example possible to detect whether there is correct operability of the movably mounted construction plate. To this end, the detection device may for example send suitable control information to a drive coupled to the movably mounted construction plate, and/or carry out position-resolved and/or time-resolved detection (monitoring) of a movement of the construction plate under the drive conditions determined by the control information. Detected movement of the construction plate allows conclusions about the operability of the movable mounting of the construction plate.

The detection device may (also) be configured in order to detect at least one, especially physical, status parameter inside a reception space, filled in particular at least in sections with construction material, of a functional unit moved into the filling or emptying section of the filling and/or emptying device. By means of a correspondingly configured detection device, particular status parameters, i.e. in particular physical status parameters, i.e. for example atmosphere, pressure, humidity, temperature, etc. may be detected inside reception spaces on the functional unit side. For the example of a metering or overflow module, for example, it is possible to detect which atmosphere, pressure, humidity, temperature, etc. there is inside the respective reception space. The detected status parameters inside a reception space allow, in particular, conclusions about the quality or processability or reusability of the construction material contained in the functional unit. The detection of corresponding status parameters may be carried out by means of suitable detection elements, for example configured in the manner of a measurement probe, which detect corresponding status parameters by means of an interface provided therefor on the functional unit side. An interface on the functional unit side may, for example, be produced through an access possibility on and/or in a reception space on the functional unit side.

Of course, the detection device may (also) be configured in order to detect an, especially physical, status parameter of a construction material, which is received in a reception space of a functional unit moved into the filling or emptying section of the filling and/or emptying device. By means of a correspondingly configured detection device, particular status parameters, i.e. especially physical status parameters, i.e. for example density, humidity, temperature, etc. of a construction material contained inside a reception space on the functional unit side, may in general be detected. For the example of a metering or overflow module, for example, it is possible to detect which density, humidity, temperature, etc. there is for a construction material. The detected status parameters inside a reception space allow, in particular, conclusions about the quality or processability or reusability of the construction material contained in the functional unit. The detection of corresponding status parameters may again be carried out by means of suitable detection elements, for example configured in the manner of a measurement probe, which detect corresponding status parameters by means of an interface provided therefor on the functional unit side. An interface on the functional unit side may, for example, again be produced through an access possibility on and/or in a reception space on the functional unit side.

Lastly, the detection device may (also) be configured in order to detect a filling level of a construction material in a reception space of a functional unit moved into the filling or emptying section of the filling and/or emptying device. By means of a correspondingly configured detection device, it is therefore possible to detect filling levels of a construction material contained in a reception space on the functional unit side. For the example of a metering or overflow module, it is therefore possible to detect which filling level there is inside the respective reception space. The detected filling levels allow, in particular, conclusions about the need for filling or emptying of the metering or overflow module. The detection of corresponding filling levels may in this case also be carried out by means of suitable detection elements, for example configured in the manner of a measurement probe, which detect corresponding filling levels via an interface provided therefor on the functional unit side. An interface on the functional unit side may in this case also be produced, for example, through an access possibility on and/or in a reception space on the functional unit side.

In view of the detection parameters which can be detected by means of a correspondingly configured detection device, the filling and/or emptying device may furthermore comprise particular devices, or at least be connected to such, by means of which particular measures may be implemented as a function of the respectively detected detection parameter, for example in order to influence the quality or processability or reusability of construction material with which a reception space on the functional unit side is to be filled, or construction material to be emptied from a reception space on the functional unit side.

The filling and/or emptying device may, for example, be assignable or assigned a temperature control device, which is provided for temperature control of a reception space of a functional unit moved into the filling or emptying section of the filling and/or emptying device and/or for temperature control of a construction material which is received in a reception space of a functional unit moved into the filling or emptying section of the filling and/or emptying device. The temperature control of the reception space, or of the construction material, which is typically to be understood as heating, may for example be carried out by means of (direct) temperature control of the functional unit and/or control (activation) of temperature control means provided on the functional unit side, i.e. for example heating elements. For temperature control of the functional unit, the temperature control device may introduce a correspondingly temperature-controlled temperature control fluid through suitable connection means or interfaces, for example into a temperature control channel structure on the functional unit side. For control (activation) of temperature control means provided on the functional unit side, the temperature control device may send control information, which is also to be understood as a mere electrical supply, through suitable connection means or interfaces to respective temperature control means provided on the functional unit side.

Furthermore, the filling and/or emptying device may be assignable or assigned an inerting device, which is configured in order to inert at least one reception space, in particular filled with construction material at least in sections, of a functional unit moved into the filling or emptying section of the filling and/or emptying device. For inerting of a reception space, the inerting device may suck non-inert gases or gas mixtures, for example air, out of the reception space through suitable connection means or interfaces and suction devices couplable or coupled thereto, and/or introduce inert gases or gas mixtures, for example argon, carbon dioxide, nitrogen, etc., into the reception space by means of blower devices couplable or coupled thereto.

The filling and/or emptying device may furthermore be assigned a sieving device, which is configured for sieving construction material with which a reception space of a functional unit moved into the filling section and/or emptying section is to be filled, and/or for sieving construction material emptied from a reception space of a functional unit moved into the filling section and/or emptying section. A corresponding sieving device allows sieving of construction material with which a reception space on the functional unit side is to be filled and/or of construction material emptied from a reception space on the functional unit side. The optionally motor-drivable sieving device may comprise at least one optionally motor-drivable sieving element, which is configured for sieving a particular particle size (fraction).

The filling and/or emptying device may furthermore be assignable or assigned a position-securing device, which is configured for securing a functional unit, moved into the filling or emptying section of the filling and/or emptying device in position. A corresponding position-securing device allows exact and stable orientation and arrangement of a functional unit moved into the filling or emptying section of the filling and/or emptying device relative to the filling and/or emptying section, and thus increases the security of the filling and/or emptying device. The position-securing device may comprise at least one, in particular mechanically and/or magnetically acting, position-securing element, for example in the form of a mechanical pin, projection, etc., or a magnetizable or magnetic magnet element, which acts in a position-securing state on the functional unit to be secured, in such a way that the functional unit is arranged and oriented exactly and stably. Of course, corresponding, in particular mechanical or magnetic, counter-securing elements on the functional unit side, for example in the form of recesses for mechanical securing pins or in the form of magnetizable or magnetic magnet elements, may be provided.

In order to control the operation of the filling and/or emptying device, i.e. in particular also at least one of the aforementioned optional devices of the filling and/or emptying device, i.e. the temperature control device, the inerting device or the position-securing device, the filling and/or emptying device may comprise a control device. The control may be carried out on the basis of at least one detection parameter detected by means of the detection device, if present. For example, control of the operation of a temperature control device may be carried out as a function of a detected temperature of a construction material, in order to temperature-control the construction material according to requirements. Correspondingly, control of the operation of an inerting device may be carried out as a function of a detected atmosphere and/or of a detected pressure inside a reception space on the functional unit side, in order to inert the reception space according to requirements.

The invention is explained in more detail with the aid of exemplary embodiments in the figures of the drawing, in which:

FIG. 3 shows a diagrammatic representation of a filling and/or emptying device according to one exemplary embodiment.

FIG. 1 shows a schematic representation of a system 1 for additive manufacturing of three-dimensional objects 2, i.e. for example technical components or technical component groups, according to one exemplary embodiment in a plan view.

Figure 2:
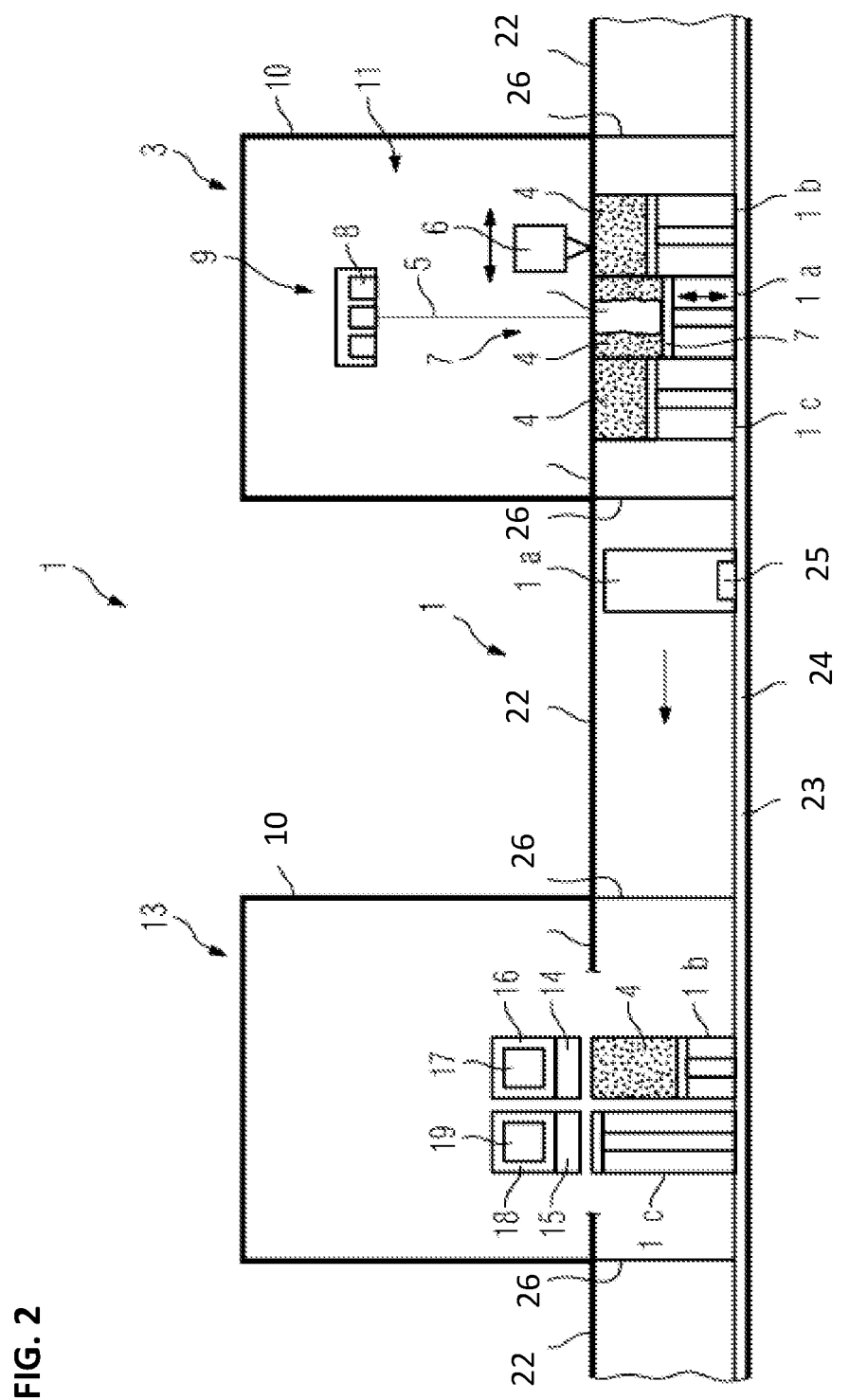
FIG. 2 shows a diagrammatic representation of a detail of the system according to the exemplary embodiment shown in FIG. 1.

The system comprises one or more stationary apparatus (es) 3 ("construction station") for additive manufacturing of three-dimensional objects 2 by successive layerwise selective exposure and consequent solidification of individual construction material layers of a solidified construction material 4 by means of at least one energy beam 5 (more specific functional details of the apparatus 3 may be found in FIG. 2). The solidified material 4 may, for example, be a metal powder. The energy beam 5 may be a laser beam. The apparatus 3 may correspondingly be an apparatus for carrying out selective laser melting methods (abbreviated to SLM methods) or selective laser sintering methods (abbreviated to SLS methods). The system 1 may correspondingly be a system for carrying out selective laser melting methods (abbreviated to SLM methods) or selective laser sintering methods (abbreviated to SLS methods).

The apparatus 3 comprises all the functional component parts required in order to carry out additive construction processes. Corresponding functional component parts include a layering device for forming construction material layers to be selectively exposed in a construction plane 7, and an exposure device 9, for example comprising one or more exposure elements 8 formed or comprising one or more laser diode elements, for generating an energy beam 5 for selective exposure of a construction material layer to be selectively exposed, formed in a construction plane 7 by means of the layering device. The functional component parts are typically arranged in a housing structure 10, defining a process chamber 11, of the apparatus 3. The process chamber 11 can be inerted, i.e. a protective gas atmosphere, for example an argon atmosphere, and/or a particular pressure level can be formed and maintained.

The system 1 comprises a plurality of modular functional units 12. The modular structure of the functional units 12 derives from a housing structure (not represented in detail), to be referred to as a "module", which (essentially) determines the outer geometrical configuration of the respective functional unit 12 and in which the respective functional constituent parts of the respective functional unit 12 are accommodated.

A first exemplary functional unit 12a is configured as a construction module. Such a construction module comprises a construction or support plate (not represented in detail) which is mounted movably, in particular height-adjustably, in a chamber-like reception space (not represented in detail), which is also to be referred to as a "construction chamber", relative to a base body of the construction module, and on which additive construction of at least one three-dimensional object 2 can be carried out. In the scope of the additive manufacturing of three-dimensional objects 2, such a construction module is used for positioning an object 2 to be manufactured while an additive construction process is being carried out, cf. the apparatus 3 shown in FIG. 2. The system 1 may be associated with a plurality of corresponding first functional units 12a.

A second exemplary functional unit 12b is configured as a metering module. Such a metering module comprises a chamber-like reception space (not represented in detail) configured in order to receive construction material 2 to be solidified in the scope of additive manufacturing of a three-dimensional object, and a metering device (not represented in detail) for metering a particular amount of construction material 2 to be solidified from the reception space. In the scope of the additive manufacturing of three-dimensional objects 2, such a metering module is used for providing (metering) a particular amount of construction material 2 to be solidified, which is distributed uniformly in a construction plane 7 by means of a layering device 6 so as to form a defined construction material layer, cf. the apparatus 3 shown in FIG. 2. The system 1 may be associated with a plurality of corresponding second functional units 12b.

A third exemplary functional unit 12c is configured as an overflow module. Such an overflow module comprises a chamber-like reception space (not represented in detail) configured in order to receive construction material 4 not solidified in the scope of additive manufacturing of a three-dimensional object 2. In the scope of the additive manufacturing of three-dimensional objects 2, the overflow module is used in particular to receive construction material 4 which is to be or has been removed from the process chamber 11 of the apparatus 3. The system 1 may be associated with a plurality of corresponding third functional units 12c.

A fourth exemplary functional unit 12d is configured as a handling module. Such a handling module comprises at least one chamber-like reception space (not represented in detail) configured in order to receive at least one additively manufactured object 2. A possibility for accessing or reaching into the reception space in order to "unload" the object 2 may be provided by means of a suitable interface (not shown). The accessing or reaching may be carried out by an operator ("glove box") or by means of a robot. The system 1 may be associated with a plurality of corresponding fourth functional units 12d.

As is revealed below, a respective functional unit 12a-12d may be moved to and fro between various stationary, i.e. not movable, constituent parts of the system 1, which are typically connected firmly to a base.

The system 1 comprises one or more stationary filling and/or emptying device(s) 13. The filling and/or emptying device 13 is configured for filling a reception space of a functional unit 12a-12d moved into a filling section 14 of the filling and/or emptying device 13 with construction material 4, and/or for emptying construction material 4 contained in a reception space of a functional unit 12a-12d moved into an emptying section 14 of the filling and/or emptying device 13. The filling and/or emptying device 13 may be referred to as a "filling station", at least in respect of corresponding filling processes.

The filling and/or emptying device 13 is formed in an inertable housing structure 20. An inert atmosphere or a particular pressure level, i.e. for example an elevated or reduced pressure, may be formed and maintained in the housing structure 20.

In the filling section 14, it is possible to fill a reception space of a functional unit 12a-12d moved into the filling section 14 with construction material 4. In the detail shown in FIG. 2, filling of a reception space of a second functional unit 12b, i.e. of a metering module, with construction material 4 is shown by way of example. The filling section 14 comprises a filling device 16. The filling device 16 comprises a conveyor device 17 for conveying construction material 4 with which a respective reception space is to be filled. The conveyor device 17 may for example be configured as a flow generating device, in particular as a blower device, which is configured in order to generate a filling (blown) flow for filling a respective reception space with construction material 4.

In the emptying section 15, it is possible to empty construction material 4 from a reception space of a functional unit 12a-12d moved into the emptying section 15. In the detail shown in FIG. 2, emptying of construction material 4 from a reception space of a third functional unit 12c, i.e. of an overflow module, is shown by way of example. The emptying section 15 comprises an emptying device 18. The emptying device 18 comprises a conveyor device 19 for conveying construction material 4 to be emptied from a respective reception space. The emptying device 18 may for example be configured as a flow generating device, in particular as a pump device, which is configured in order to generate an emptying (suction) flow for emptying construction material 4 from a respective reception space.

The filling and/or emptying device 13 may hold a plurality of (chemically) different construction materials 4, so that individual filling of different functional units 12a-12d with different construction materials 4 is possible. A first functional unit 12a-12d moved into the filling section 14 may for example be filled with a steel powder, and a second functional unit 12a-12d moved into the filling section 14 may for example be filled with an aluminum powder. Similarly, individual emptying of different functional units 12a-12d is possible; (chemically) different construction materials 4 may therefore be emptied from different functional units 12a-12d and stored, processed further, etc., separately from one another.

The system 1 furthermore comprises a tunnel structure 21. The tunnel structure 21 comprises a plurality of tunnel portions 22, in which or through which the functional units 12a-12d can be moved. Formed or arranged in a respective tunnel portion 22, there is at least one movement path 22, along which a functional unit 12a-12d can be moved through the tunnel portion 22. It is possible to form or arrange a plurality of movement paths 23 in a tunnel portion 22, at least in sections, i.e. for example movement paths 23 arranged next to one another, in particular parallel, in one or more planes. A corresponding movement path allows guided movement of a functional unit 12a-12d in or through the respective tunnel portion 22.

Figure 1:
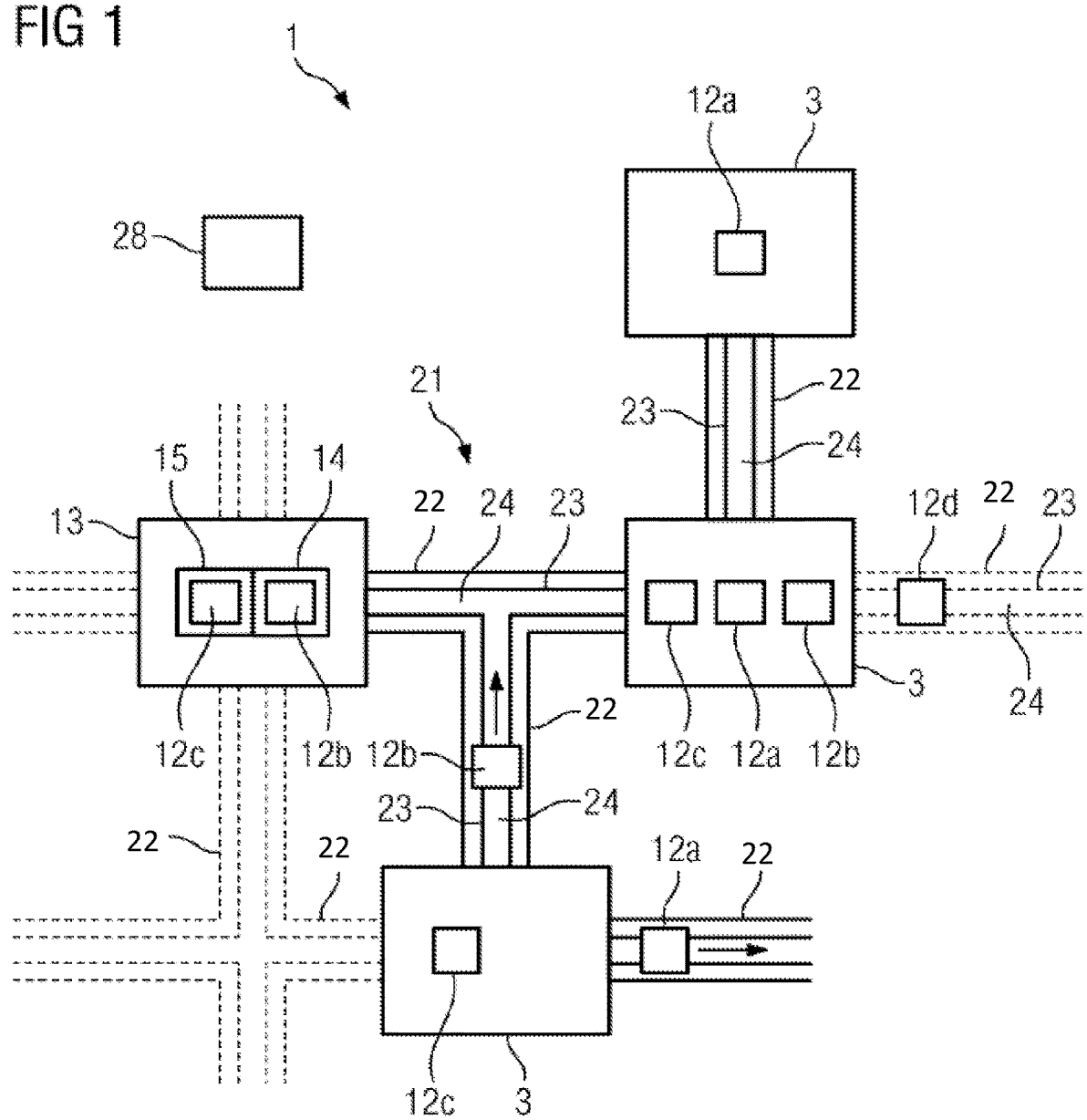
FIG. 1 shows a diagrammatic representation of a system for additive manufacturing of three-dimensional objects according to one exemplary embodiment.

With the aid of FIG. 1, it can be seen that a tunnel portion 22 may open into at least one further tunnel portion 22, for example extending at an angle to it. The tunnel structure 21 comprises—in a similar way to a track or rail system known from railroad traffic—a plurality of tunnel portions 22 opening into one another at defined positions (cf. in this regard also the tunnel portions 22 corresponding to dashed representations in FIG. 1). A plurality of tunnel portions 22 may extend next to, above or below one another, at least in sections. The tunnel structure may therefore comprise a plurality of tunnel portions 22 extending next to, above or below one another, at least in sections, i.e. in different (horizontal and/or vertical) planes.

The tunnel portions 22 may be inertable, i.e. an inert atmosphere, a particular pressure level, i.e. for example an elevated or reduced pressure, may be formed and maintained in it.

The function of the tunnel structure 21, or the tunnel portions 22 associated therewith, is to connect different stationary constituent parts of the system 1, i.e. for example apparatuses 3 and the filling and/or emptying device 13, to one another directly or indirectly, i.e. for example with the interposition of at least one further tunnel portion 21 and/or a further stationary constituent part of the system 1. The connection of respective stationary constituent parts of the system 1 allows movement of respective functional units 12a-12d to and fro between respective stationary constituent parts of the system 1. Movements of respective functional units through the tunnel structure 21 are, in particular, possible in a fully automated manner. By means of one or more tunnel portions 22, for example, a stationary apparatus 3 ("construction station") may be connected to the stationary filling and/or emptying device 13 ("filling station").

In order to move respective functional units 12a-12d, the system 1 comprises a conveyor device 24 coupled to a (motor) drive device, by means of which a drive force setting a functional unit 12a-12d in motion can be generated. The conveyor device 24 may comprise a conveyor means 25, which is arranged or formed on the tunnel structure side (cf. FIG. 2) and is configured in order to set a functional unit 12a-12d in motion. The conveyor means 25 may, for example, be a mechanical conveyor means, i.e. for example a belt, chain or roller conveyor, which, by its spatial extent inside a respective tunnel portion 22, defines a conveyor length, and therefore the movement path 23 along which a functional unit 12a-12d can be moved. With the aid of FIG. 2, it can be seen that a corresponding conveyor means may, for example, be arranged or formed on the floor side or wall side on a wall of a tunnel portion 21.

It is also conceivable for the conveyor device 24 to comprise respective conveyor means 25, which are arranged or formed on the functional unit side and are configured in order to set the functional units 12a-12d equipped with them in motion (cf. FIG. 2). Such conveyor means 25 may, for example, be an (electric) motor drive device (not represented in detail) integrated into a respective functional unit 12a-12d. In this way, the freedom of movement of a functional unit 12a-12d may be extended, since for example rotational movements about a vertical axis are possible.

The selection of a movement path of one or more functional units 12a-12d between respective stationary constituent parts of the system 1 may be made on the basis of particular prioritizations of particular functional units 12a-12d. For higher-prioritized functional units 12a-12d, movement paths 23 which are of shorter length or are faster may be selected than for lower-prioritized functional units 12a-12d. Equally well, higher-prioritized functional units 12a-12d may be moved with a higher speed in comparison with lower-prioritized functional units 12a-12d.

The control of all the movements of the functional units 12a-12d moved in the tunnel structure 21 is carried out by means of a central control device 28, which expediently communicates, for example on the basis of radio, directly or indirectly with respective functional units 12a-12d, which to this end may be equipped with suitable communication devices (not represented in detail). In the control device 28, there is expediently all the information relevant for the movement of respective functional units 12a-12d inside the tunnel structure 21, i.e. in particular respective movement information, i.e. for example speed information, respective position information, i.e. for example start and target information, respective prioritization information, etc. The control of the movements of the functional units 12a-12d moved in the tunnel structure 21 may be carried out in a fully automatic way.

In order to be connected to the tunnel structure 21, the stationary constituent parts of the system 1 comprise a connecting portion 26, by means of which they can be or are connected to the tunnel structure 21. With the aid of FIG. 2, a connecting portion 26 of the apparatus 3 can be seen, by means of which the apparatus 3 is connected to the tunnel structure 21, i.e. to a tunnel portion 22. Corresponding functional units 12a-12d can be moved starting from the apparatus 3 into the tunnel structure 21, or starting from the tunnel structure 21 into the apparatus 3. In a similar way to the apparatus 3, the filling and/or emptying device 13 also comprises a connecting section 26, by means of which the filling and/or emptying device 13 is connected to the tunnel structure 21, i.e. to a tunnel portion 22. Functional units 12a-12d can therefore be moved starting from the filling and/or emptying device 13 into the tunnel structure 21, or starting from the tunnel structure 21 into the filling and/or emptying device 13.

In respective stationary constituent parts of the system 1, i.e. for example in the apparatus 3 or in the filling and/or emptying device 13, a tunnel section 22 of the tunnel structure 21 is likewise arranged or formed, which communicates via the respective connecting portion 26 with a tunnel portion 22 arranged or formed outside the respective stationary consituent part of the system 1 (cf. FIG. 2).

FIG. 3 shows a schematic representation of a filling and/or emptying device 13, with the aid of which particular modifications of the filling and/or emptying device 13 it will be explained.

The filling and/or emptying device 13 shown in FIG. 3 is assigned a detection device 29. The detection device 29 comprises detection elements (not shown), which are implemented as hardware and/or software and by means of which different detection parameters may be detected. All the detection parameters detected by the detection device 29 may be transmitted via an optionally wireless data or communication network (not shown) to at least one communication partner, i.e. for example the control device 28 of the system 1.

The detection device 28 may be configured in order to detect a functional unit 12a-12d moved into the filling section 14 and/or into the emptying section 15. By means of the detection device 28, it is therefore possible to detect whether a functional unit 12a-12d is moved into the filling or emptying section 14, 15. In the event that a functional unit 12a-12d moved into the filling and/or emptying section 14, 15 is detected, it is furthermore possible to detect which type of functional unit 12a-12d is specifically involved. The detection of a functional unit 12a-12d moved into the filling section or emptying section 14, 15, or its type, may for example be carried out optically, i.e. for example by means of an optical scanning process, or mechanically, i.e. for example by means of detecting the weight of the functional unit 12a-12d acting on a weight sensor 30 arranged or formed in a filling and/or emptying section 14, 15.

The detection device 29 may (also) be configured in order to detect at least one status parameter, in particular the operability, of at least one functional element of a functional unit 12a-12d moved into the filling or emptying section 14, 15. By means of the detection device 28, it is therefore possible to detect particular status parameters, i.e. in particular the operability, of particular functional elements of a functional unit 12a-12d. For the example of a construction module (cf. first functional unit 12a), it is for example possible to detect whether there is correct operability of the movably mounted constructional support plate 27. To this end, the detection device may for example send suitable control information to a drive (not shown) coupled to the movably mounted construction or support plate 27, and for example carry out position-resolved and/or time-resolved detection (monitoring) of a movement of the construction plate 27 under the drive conditions determined by the control information.

The detection device 29 may (also) be configured in order to detect at least one, especially physical, status parameter inside a reception space, filled in particular at least in sections with construction material 4, of a functional unit 12a-12d moved into the filling or emptying section 14, 15. By means of the detection device 29, particular status parameters, i.e. in particular physical status parameters, i.e. for example atmosphere, pressure, humidity, temperature, etc. may be detected inside reception spaces on the functional unit side. For the example of a metering or overflow module (cf. second, third functional units 12b, 12c), for example, it is possible to detect which atmosphere, pressure, humidity, temperature, etc. there is inside the respective reception space. The detection of corresponding status parameters may be carried out by means of suitable detection elements (not shown), for example configured in the manner of a measurement probe, which detect corresponding status parameters by means of an interface provided therefor on the functional unit side. An interface on the functional unit side may, for example, be produced through an access possibility on and/or in a reception space on the functional unit side.

The detection device 29 may (also) be configured in order to detect a status parameter, especially physical status parameter of a construction material 4 which is contained in a reception space of a functional unit 12a-12d moved into the filling or emptying section 14, 15. By means of the detection device 29, in general particular status parameters, i.e. in particular physical status parameters, i.e. for example density, humidity, temperature, etc. of a construction material 4 contained inside a reception space on the functional unit side may be detected. For the example of a metering or overflow module (cf. second, third functional units 12b, 12c), for example, it is possible to detect which density, humidity, temperature, etc. there is for a construction material 4. The detection of corresponding status parameters may again be carried out by means of suitable detection elements (not shown), for example configured in the manner of a measurement probe, which detect corresponding status parameters by means of an interface provided therefor on the functional unit side. An interface on the functional unit side may again, for example, be produced through an access possibility on and/or in a reception space on the functional unit side.

Lastly, the detection device 29 may (also) be configured in order to detect a filling level of a construction material 4 in a reception space of a functional unit 12a-12d moved into the filling or emptying section 14, 15. By means of the detection device 29, it is therefore possible to detect filling levels of a construction material 4 contained in a reception space on the functional unit side. For the example of a metering or overflow module (cf. second, third functional units 12b, 12c), it is therefore possible to detect which filling level there is inside the respective reception space. The detection of corresponding filling levels may in this case also be carried out by means of suitable detection elements (not shown), for example configured in the manner of a measurement probe, which detect corresponding filling levels via an interface provided therefor on the functional unit side. An interface on the functional unit side may in this case also be produced, for example, through an access possibility on and/or in a reception space on the functional unit side.

The filling and/or emptying device 13 furthermore comprises particular devices by means of which particular measures may be implemented as a function of the respectively detected detection parameter, for example in order to influence the quality or processability or reusability of construction material 4 with which a reception space on the functional unit side is to be filled, or construction material 4 to be emptied from a reception space on the functional unit side.

The filling and/or emptying device 13 is assigned a temperature control device 31, which is configured for temperature control of a reception space of a functional unit 12a-12d moved into the filling or emptying section 14, 15 and/or for temperature control of a construction material 4 which is received in a reception space of a functional unit 12a-12d moved into the filling or emptying section 14, 15. The temperature control of the reception space, or of the construction material 4, which is typically to be understood as heating, may for example be carried out by means of (direct) temperature control of the functional unit 12a-12d and/or control (activation) of temperature control means (not shown) provided on the functional unit side, i.e. for example heating elements.

Furthermore, the filling and/or emptying device 13 is assigned an inerting device 32, which is configured in order to inert a reception space, filled with construction material 4, of a functional unit 12a-12d moved into the filling or emptying section 14, 15. For inerting of a reception space, the inerting device 31 may suck non-inert gases or gas mixtures, for example air, out of the reception space through suitable connection means (not shown) or interfaces and suction devices (not shown) couplable or coupled thereto, and/or introduce inert gases or gas mixtures, for example argon, carbon dioxide, nitrogen, etc., into the reception space by means of blower devices (not shown) couplable or coupled thereto.

The filling and/or emptying device 13 is furthermore assigned a sieving device 36, which is configured for sieving construction material 4 with which a reception space of a functional unit 12a-12d moved into the filling section 14 is to be filled, and/or for sieving construction material 4 emptied from a reception space of a functional unit 12a-12d moved into the emptying section 15. The motor-drivable sieving device 36 allows sieving of construction material 4 with which a reception space on the functional unit side is to be filled and/or of construction material 4 emptied from a reception space on the functional unit side. The sieving device 36 comprises at least one sieving element (not represented in detail), which is configured for sieving a particular particle size (fraction).

The filling and/or emptying device 13 is furthermore assigned a position-securing device 33, which is configured for securing a functional unit 12a-12d, moved into the filling or emptying section 14, 15 in position. The position-securing device 33 allows exact and stable orientation and arrangement of a functional unit 12a-12d moved into the filling or emptying section 14, 15 relative to the filling and/or emptying section 14, 15. The position-securing device 33 comprises, in particular mechanically and/or magnetically acting, position-securing elements 34, for example in the form a mechanical pins or magnet elements, which act in a position-securing state on the functional unit 12a-12d to be secured, in such a way that it is arranged and oriented exactly and stably.

In order to control the operation of the filling and/or emptying device 13, i.e. also of the temperature control device 31, the inerting device 32, sieving device 36 and the position-securing device 33, the filling and/or emptying device 13 may comprise its own control device 35. The control may be carried out on the basis of at least one detection parameter detected by means of the detection device 29.

Individual, several or all of the features presented in relation to a particular exemplary embodiment may be applied to at least one other exemplary embodiment.

LIST OF REFERENCES 1 apparatus
2 object
3 apparatus
4 construction material
5 energy beam
6 layering device
7 construction plane
8 exposure elements
9 exposure device
10 housing structure
11 process chamber
12 functional unit
13 filling and/or emptying device
14 filling section
15 emptying section
16 filling device
17 conveyor device
18 emptying device
19 conveyor device
20 housing structure
21 tunnel structure
22 tunnel portion
23 movement path
24 conveyor device
25 conveyor means
26 connecting portion
27 construction/support plate
28 control device
29 detection device
30 weight sensor
31 temperature control device
32 inerting device
33 position-securing device
34 position-securing element
35 control device
36 sieving device

The invention claimed is:

1. A system for additive manufacturing of three-dimensional objects, the system comprising:
at least one movable modular functional unit comprising a reception space for receiving construction material and/or an additively manufactured object;
a tunnel structure comprising at least one tunnel portion, wherein at least one movable modular functional unit can be moved through the at least one tunnel portion;
at least one apparatus for additive manufacturing of a three-dimensional object, wherein the apparatus is connected to the tunnel structure such that the at least one movable modular functional unit can be moved from the apparatus into the tunnel structure and/or from the tunnel structure into the apparatus; and,
a filling and/or emptying device configured to fill and/or empty the at least one movable modular functional unit with construction material, wherein the filling and/or emptying device is connected with the tunnel structure such that the at least one movable modular functional unit can be moved from the filling and/or emptying device into the tunnel structure and/or from the tunnel structure into the filling and/or emptying device.

2. The system of claim 1, wherein the at least one apparatus and the filling and/or emptying device are physically separated by the tunnel structure.

3. The system of claim 1, wherein the tunnel comprises an enclosed cross-section.

4. The system of claim 3, wherein the enclosed cross-section comprises a round or polygonal cross-sectional area.

5. The system of claim 3, wherein at least a portion of the tunnel can maintain an inert atmosphere.

6. The system of claim 1, wherein the filling and/or emptying device is arranged in a housing structure that can maintain an inert atmosphere.

7. The system of claim 1, wherein a detection device is assigned to the filling and/or emptying device for:
detecting a functional unit moved into a filling section and/or an emptying section of the filling and/or emptying device, and/or
detecting at least one status parameter of at least one functional element of a functional unit moved into the filling section and/or an emptying section of the filling and/or emptying device, and/or
detecting at least one status parameter within the reception space of a functional unit moved into the filling section and/or an emptying section of the filling and/or emptying device, and/or
detecting a filling level of construction material received in the reception space of a functional unit moved into the filling section and/or an emptying section of the filling and/or emptying device, and/or
detecting at least one status parameter of construction material received in the reception space of a functional unit moved into the filling section and/or an emptying section of the filling and/or emptying device.

8. The system of claim 1 further comprising an inerting device for inerting at least one reception space of a functional unit moved into the filling section and/or emptying section of the filling and/or emptying device.

9. The system of claim 1 further comprising a sieving device for sieving construction material to be filled into the reception space of a functional unit moved into the filling section and/or emptying section of the filling and/or emptying device.

10. The system of claim 1 further comprising a position-securing device for securing a functional unit moved into the filling section and/or emptying section of the filling and/or emptying device.

11. The system of claim 1 further comprising a control device for controlling operation of:
the filling and/or emptying device, and/or
a temperature control device, and/or
an inerting device, and/or
a sieving device, and/or
a positing-securing device.

12. The system of claim 11, wherein the control device controls operation based at least on feedback from at least one detection device.

13. The system of claim 1 further comprising an actuating device for actuating the at least one movable modular functional unit through the tunnel structure.

14. The system of claim 1, wherein at least one movable modular functional unit comprises a construction module comprising a reception space for receiving a construction plate, wherein the construction plate is movable with respect to the movable modular functional unit.

15. The system of claim 1, wherein at least one movable modular functional unit comprises a metering module comprising a metering device for metering construction material.

16. The system of claim 1, wherein at least one movable modular functional unit comprises an overflow module for receiving non-solidified construction material when additive manufacturing the three-dimensional object.

17. The system of claim 1, wherein at least one movable modular functional unit comprises a handling module for receiving the three-dimensional object.

* * * * *